United States Patent [19]

Halmos

[11] Patent Number: 4,516,370

[45] Date of Patent: May 14, 1985

[54] SHEET METAL JOINT, STRUCTURE UTILIZING THE SAME, AND METHOD OF CONSTRUCTION

[75] Inventor: George T. Halmos, Willowdale, Canada

[73] Assignee: Delta Engineering Ltd., Willowdale, Canada

[21] Appl. No.: 464,554

[22] Filed: Feb. 7, 1983

[51] Int. Cl.³ .............................................. E04B 1/32
[52] U.S. Cl. ...................................... 52/245; 52/584; 220/5 A; 29/256
[58] Field of Search ................. 52/192, 245, 247, 249, 52/581, 584, 520; 220/5 A; 403/388; 29/256 A; 4/506

[56] References Cited

U.S. PATENT DOCUMENTS

| | | | |
|---|---|---|---|
| 1,631,051 | 5/1927 | Nichols | 220/5 A |
| 2,153,492 | 4/1939 | Workman | 52/247 |
| 4,223,498 | 9/1980 | Ventrice | 403/388 |

FOREIGN PATENT DOCUMENTS

| | | | |
|---|---|---|---|
| 420307 | 4/1947 | Italy | 52/520 |
| 550277 | 12/1942 | United Kingdom | 52/245 |

Primary Examiner—Henry E. Raduazo
Attorney, Agent, or Firm—Sim & McBurney

[57] ABSTRACT

There is provided an edge joint between two pieces of metal sheet material, in which a marginal portion of each piece is folded back to lie adjacently along the main portion of that piece. The two pieces are arranged so that the marginal portion of one piece is sandwiched between the main portions of the two pieces, and the main portion of the other piece is sandwiched between the marginal portions of the two pieces. Apertures in the pieces pass through the folded regions, and the apertures are aligned so that a fastener can be placed through the aligned apertures for joining the two pieces.

10 Claims, 3 Drawing Figures

SHEET METAL JOINT, STRUCTURE UTILIZING THE SAME, AND METHOD OF CONSTRUCTION

This invention relates generally to building structures and methods, and has to do particularly with a sheet metal joint, a building constructed utilizing that joint, and the method by which the joint is put together.

In a general way, this invention is applicable to the construction of grain bins, storage bins, silos for general use, and tanks. It finds special application for such structures when made from a plurality of sheet metal pieces, such pieces being juxtaposed and joined edgewise with standard fasteners such as nut-and-bolt combinations.

It is known to strengthen the edge region of a piece of metal sheet material by folding a marginal portion thereof back to lie adjacently along and against the main portion of that piece. It is also known to provide what is called a "Pittsburgh joint", in which two such metal pieces with folded-back marginal portions are arranged so that the marginal portions reciprocally receive each other. In other words, the marginal portion of one piece is sandwiched between the main portion of the other and the marginal portion of the other, and vice versa. This construction is also utilized in tin cans, containers of various kinds and the like.

However, for purposes of putting together a relatively large building structure from heavy and unwieldy pieces of metal sheet material, it is not convenient to utilize the Pittsburgh joint method. In any event, the Pittsburgh joint is used primarily to achieve a good seal, and there would not be any convenient way of crimping such a Pittsburgh joint in a large building structure such as a metal silo. There are other disadvantages of the Pittsburgh joint in connection with larger metal structures, which will be explained subsequently in reference to the drawings.

It is an aspect of this invention to provide a joint for use between two pieces of metal sheet material, a structure made of pieces of sheet material thus joined, and a method for constructing the structure, which exhibits advantages over the joints, structures, buildings and methods known in the prior art.

Accordingly, this invention provides an edge joint between two pieces of metal sheet material, a marginal portion of each piece being folded back to lie adjacently along the main portion of that piece, the pieces being arranged so that the marginal portion of one piece is sandwiched between the main portions of the two pieces, and the main portion of the other piece is sandwiched between the marginal portions of the two pieces, at least one aperture in each piece passing through both of its portions, the apertures of the two pieces being aligned, and a fastener through said aligned apertures for joining the two pieces.

Further, this invention provides a structure made of a plurality of pieces of metal sheet material having juxtaposed edges, thereby providing a plurality of edge joints between two pieces, a marginal portion of each piece in at least some edge joints being folded back to lie adjacently along the main portion of that piece, said pieces being arranged so that the marginal portion of one piece is sandwiched between the main portions of the two pieces, and the main portion of the other piece is sandwiched between the marginal portions of the two pieces, at least one aperture in each piece through both of its portions, the apertures of the two pieces being aligned, and a fastener through said aligned apertures and joining the two pieces.

Finally, this invention provides a method for building a structure from a plurality of pieces of metal sheet material, comprising the steps:

(a) providing a strengthening portion along edges of the pieces by folding back marginal portions thereof to lie adjacently along the main portions, and providing apertures in each piece through both of its portions, (b) juxtaposing two pieces so that the marginal portion of one piece is sandwiched between the main portions of the two juxtaposed pieces, and the main portion of the other piece is sandwiched between the marginal portions of the two pieces, and so that an aperture in one piece registers with an aperture in the other piece, (c) and applying a fastener through said registering apertures to fasten said pieces together.

One embodiment of this invention is illustrated in the accompanying drawings, in which like numerals denote like parts throughout the several views, and in which.

Figure 1:
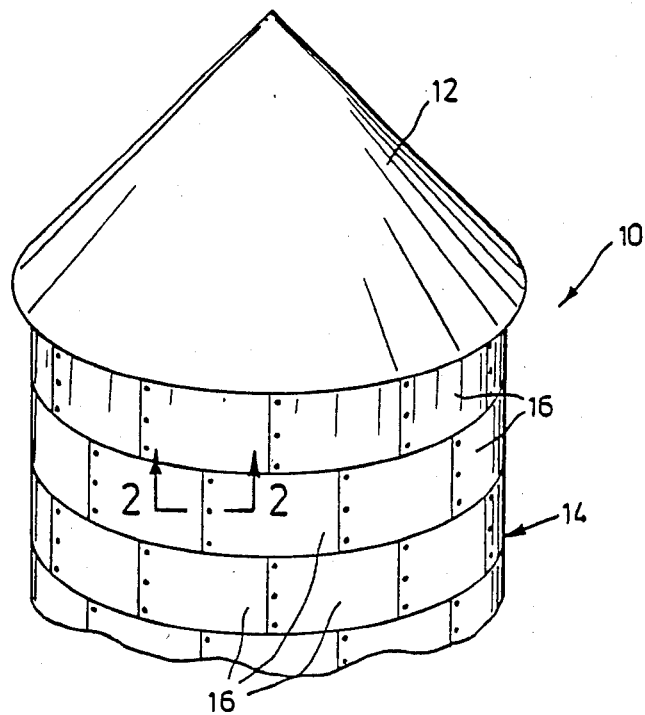
FIG. 1 is a perspective view of a portion of a metal silo constructed in accordance with this invention.

Turning first to FIG. 1, there is illustrated a metal silo identified generally by the numeral 10, having a conical roof 12, and a cylindrical side wall 14 consisting of a plurality of pieces 16 of metal sheet material. The pieces 16 are cylindrically curved to match the desired curve of the wall 14, but if flattened out would have a substantially rectangular configuration.

Figure 2:
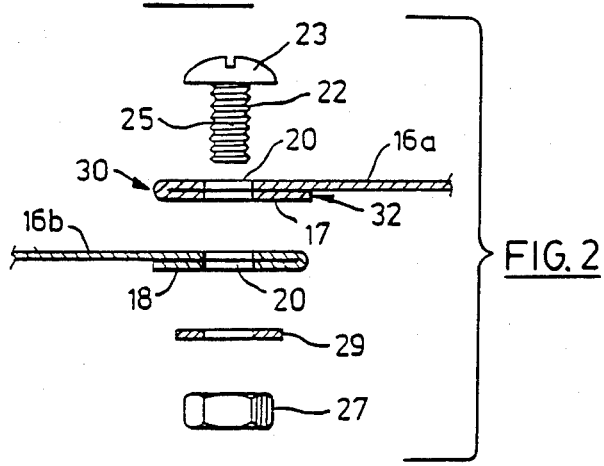
FIG. 2 is a sectional view taken along the line 2—2 in FIG. 1.

FIG. 2 shows the joint between two horizontally adjacent pieces 16 in FIG. 1, and is taken along the line 2—2 in that Figure. In FIG. 2 the various components have been exploded to show the construction, although it will be understood that in FIG. 1 these parts are fastened together.

Figure 3:
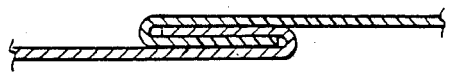
FIG. 3 illustrates a "Pittsburgh joint" belonging to the prior art.

In FIG. 2, a first piece 16a of metal sheet material has a marginal portion 17 thereof folded back to lie adjacently along the main portion of the piece 16a. Likewise, a piece 16b of metal sheet material has a marginal portion 18 thereof folded back to lie adjacently along its main portion. It is to be noted that the pieces are arranged in such a way that the marginal portion 17 of the first piece 16a will, when the joint is fastened together, be sandwiched between the main portions of the two pieces, while the main portion 16b of the other piece will be sandwiched between the marginal portions 17 and 18. This construction is completely distinguishable from the Pittsburgh joint, which is shown in FIG. 3. As can be seen in FIG. 3, there is again an arrangement in which a marginal portion of each piece is folded back parallel to its main part, but there is a gap or space between each marginal portion and its main part, adapted to receive the marginal portion of the other piece. This is not the case in FIG. 2, as there is no interleaving or "clasping" between the two pieces.

In FIG. 2, it can be seen that each piece has an aperture 20 passing through both of its portions (the marginal portion and the main portion), and that the apertures of the two pieces 16a and 16b are aligned. Moreover, a fastener is illustrated in alignment with the aligned apertures 20, the fastener including a bolt 22 with a head 23 and a threaded shank 25, and a nut 27. In FIG. 2 a washer 29 is also illustrated as part of the fastener.

In accordance with this invention, when constructing a building structure such as that illustrated in FIG. 1, the joints illustrated in FIG. 2 are arranged such that the marginal portions of the two pieces are toward the inside of the building. This means that, in FIG. 2, the "outside" would be upwardly, and the "inside" would be downwardly. This prevents a catching or rough edge appearing along the outside of the building, since all accessible edge parts of the metal pieces are the folds, such as illustrated by the fold 30 in FIG. 2.

A further advantage is inherent in the structure shown in FIG. 2, and this can best be explained by comparing FIG. 2 with FIG. 3. In the case of tension exerted between the pieces 16a and 16b, it will be realized in FIG. 2 that the lines of force along which the tension is exerted are very nearly aligned, although not fully aligned. In effect, these lines of force are as close as they can be, short of reversing the piece 16a so that its marginal portion 17 lies to the outside. In such a reversed situation, the lines of force would be as aligned as possible, since the main portions of the pieces 16a and 16b would be lying against each other. However, such a reversed construction would cause the rough edge 32 to be outwardly on the building, which is a disadvantage. Thus, the construction of FIG. 2 shows the optimum compromise which keeps the lines of force (in a tension situation) as close as possible, without exposing a rough edge to the outside of the building. Conversely, if a Pittsburgh joint arrangement were to be used, such as that shown in FIG. 3, the lines of force along which tension is exerted are as far away from each other as they can possibly be, since both marginal portions are interposed between the main portions. Thus, the Pittsburgh joint shown in FIG. 3 is disadvantageous due to the interposition of the marginal portions between the two main portions, whereas the "reversed" situation discussion earlier in connection with FIG. 2, in which the marginal portions 17 and 18 are remote from each other and sandwich between them the two main portions, is disadvantageous from the point of view of presenting a rough edge to the outside of the building.

A further advantage arises in connection with the construction shown in FIGS. 1 and 2, and this relates primarily to the strengthening feature provided by the folding over of the marginal portions 17 and 18. More particularly, due to the strengthening feature thus provided, it is not necessary to provide as many fasteners in the building as a whole. In other words, the distance between adjacent fasteners can be increased due to the greater strength along the edges of the pieces 16. Since the cost of constructing a silo or similar structure such as that shown in FIG. 1 is labour-intensive, it obviously represents a considerable saving to be able to shorten the time taken for the construction of the structure. Essentially, to put a structure such as that shown in FIG. 1 together, at least two workers are required: one to work on the inside of the building, and one to work on the outside. The workers work together particularly in terms of the fasteners, with one holding one part of the fastener, and the other worker turning the other part. By reducing the number of fasteners required for a building, the length of time taken for its assembly is clearly minimized.

It will be appreciated by those skilled in the art that the essence of this invention could be applied to culvert pipes and similar corrugated products, and also to arched buildings or arched roofs. In the case of culvert pipes, the fastening shown in FIG. 2 could be replaced by rivets or analogous items.

It will be appreciated that, in the case of corrugated sheets, the Pittsburgh joint shown in FIG. 3 is not applicable, due to the great difficulty of manufacturing. For the Pittsburgh lock, a material thickness gap has to be left between the folded pieces, and in order to accomplish this with corrugated stock, the manufacturing problems are formidable. By comparison with the Pittsburgh joint, the present invention calls for the marginal portion to be folded flatly against the main part of the sheet, and this is not difficult to accomplish in connection with corrugated stock.

I claim:

1. An edge joint between two pieces of metal sheet material, a marginal portion of each piece being folded back to lie adjacently along the main portion of that piece, the pieces being arranged so that the marginal portion of one piece is sandwiched between the main portions of the two pieces, and the main portion of the other piece is sandwiched between the marginal portions of the two pieces, a least one aperture in each piece passing through both of its portions, the apertures of the two pieces being aligned, and a fastener through said aligned apertures for joining the two pieces.

2. The combination claimed in claim 1, in which the folded-back marginal portions of the two pieces have substantially the same width, and in which the apertures are located centrally with respect to the marginal portions.

3. The combination claimed in claim 1, in which the fastener includes a bolt and a nut.

4. A structure made of a plurality of pieces of metal sheet material having juxtaposed edges, thereby providing a plurality of edge joints between two pieces, a marginal portion of each piece in at least some edge joints being folded back to lie adjacently along the main portion of that piece, said pieces being arranged so that the marginal portion of one piece is sandwiched between the main portions of the two pieces, and the main portion of the other piece is sandwiched between the marginal portions of the two pieces, at least one aperture in each piece through both of its portions, the apertures of the two pieces being aligned, and a fastener through said aligned apertures and joining the two pieces.

5. The structure claimed in claim 4, in which the said marginal portions are toward the inside of the building.

6. The structure claimed in claim 5, in which the fastener includes a bolt and a nut, with the nut on the inside of the building structure.

7. The structure claimed in claim 4, in which the building structure is circular in plan, and in which the individual pieces span only part of the circular periphery of the structure.

8. A method for building a structure from a plurality of pieces of metal sheet material, comprising the steps:
(a) providing a strengthening portion along edges of the pieces by folding back marginal portions thereof to lie adjacently along the main portions, and providing apertures in each piece through both of its portions,
(b) juxtaposing two pieces so that the marginal portion of one piece is sandwiched between the main portions of the two juxtaposed pieces, and the main portion of the other piece is sandwiched between the marginal portions of the two pieces, and so that an aperture in one piece registers with an aperture in the other piece, (c) and applying a fastener through said registering apertures to fasten said pieces together.

9. The method claimed in claim 8, in which the said marginal portions are arranged toward the inside of the building.

10. The method claimed in claim 9, in which the fastener includes a bolt and a nut, with the nut on the inside of the building.

* * * * *